United States Patent
Jain et al.

(10) Patent No.: US 11,818,329 B1
(45) Date of Patent: Nov. 14, 2023

(54) SYNCHRONIZING STEREOSCOPIC CAMERAS USING PADDING DATA SETTING MODIFICATION

(71) Applicant: GHOST AUTONOMY INC., Mountain View, CA (US)

(72) Inventors: Ashish Jain, Sydney (AU); Nelson Tam, Sydney (AU); Anjani Kumar Verma, Sydney (AU); James S. Cross, San Francisco, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 0 days.

(21) Appl. No.: 17/934,122

(22) Filed: Sep. 21, 2022

(51) Int. Cl.
| | |
|---|---|
| H04N 13/296 | (2018.01) |
| H04N 13/239 | (2018.01) |
| H04N 13/167 | (2018.01) |
| B60R 11/04 | (2006.01) |
| H04N 23/661 | (2023.01) |
| H04N 23/60 | (2023.01) |
| H04N 25/40 | (2023.01) |

(52) U.S. Cl.
CPC ........... *H04N 13/296* (2018.05); *B60R 11/04* (2013.01); *H04N 13/167* (2018.05); *H04N 13/239* (2018.05); *H04N 23/661* (2023.01); *H04N 23/662* (2023.01); *H04N 23/665* (2023.01); *H04N 25/41* (2023.01)

(58) Field of Classification Search
CPC .. H04N 23/665; H04N 23/661; H04N 23/662; H04N 25/41; H04N 13/167; H04N 13/239; H04N 13/296
See application file for complete search history.

(56) References Cited

U.S. PATENT DOCUMENTS

| | | | | |
|---|---|---|---|---|
| 5,327,235 A | * | 7/1994 | Richards | H04N 7/0125 348/E7.016 |
| 6,092,130 A | * | 7/2000 | Horiike | G11B 20/1217 375/E7.267 |
| 7,978,884 B1 | * | 7/2011 | Thomas | G06V 40/12 340/5.83 |
| 10,368,057 B1 | * | 7/2019 | Saran | H04N 13/257 |
| 10,873,726 B1 | * | 12/2020 | Maldonado | H04N 17/004 |
| 11,640,268 B2 | * | 5/2023 | Hayes | G06F 3/0659 711/154 |
| 11,640,342 B2 | * | 5/2023 | Hayes | G06F 11/0739 714/11 |
| 2007/0222878 A1 | * | 9/2007 | Tanifuji | H04N 3/155 348/E3.018 |
| 2007/0279494 A1 | * | 12/2007 | Aman | G06V 20/40 348/169 |
| 2009/0109281 A1 | * | 4/2009 | Mashitani | H04N 13/139 348/E13.001 |

(Continued)

*Primary Examiner* — Brian P Yenke

(57) ABSTRACT

Synchronizing stereoscopic cameras using padding data setting modification may include: receiving a first frame from a first camera and a second frame from a second camera; calculating a differential between a first time corresponding to the first frame and a second time corresponding to the second frame; determining whether the differential exceeds a threshold; and increasing, responsive to the differential exceeding the threshold, a frame rate of the first camera relative to the second camera by transmitting a padding data instruction to the first camera or the second camera.

20 Claims, 13 Drawing Sheets

(56) References Cited

U.S. PATENT DOCUMENTS

| | | | | |
|---|---|---|---|---|
| 2011/0210941 A1* | 9/2011 | Reynolds | G06F 3/04184 | 345/174 |
| 2011/0242356 A1* | 10/2011 | Aleksic | H04N 13/161 | 348/222.1 |
| 2012/0033039 A1* | 2/2012 | Sasaki | H04N 13/161 | 348/E13.001 |
| 2012/0206565 A1* | 8/2012 | Villmer | H04N 1/00 | 348/E5.026 |
| 2013/0021352 A1* | 1/2013 | Wyatt | G09G 5/395 | 345/520 |
| 2013/0021438 A1* | 1/2013 | Tucker | H04N 13/178 | 348/43 |
| 2013/0242135 A1* | 9/2013 | Muraki | H04N 23/662 | 348/231.5 |
| 2014/0078256 A1* | 3/2014 | Ogawa | H04N 13/106 | 348/43 |
| 2015/0297949 A1* | 10/2015 | Aman | G06T 7/246 | 348/157 |
| 2016/0119532 A1* | 4/2016 | Chen | H04N 23/90 | 348/211.2 |
| 2016/0328884 A1* | 11/2016 | Schowengerdt | G02B 27/017 | |
| 2017/0078647 A1* | 3/2017 | Van Hoff | H04N 23/57 | |
| 2017/0336858 A1* | 11/2017 | Lee | H04N 23/64 | |
| 2018/0241922 A1* | 8/2018 | Baldwin | H04N 23/45 | |
| 2018/0324410 A1* | 11/2018 | Roine | H04N 23/698 | |
| 2020/0014838 A1* | 1/2020 | Mitsubayashi | H04N 23/66 | |
| 2020/0068123 A1* | 2/2020 | Chen | H04N 23/54 | |
| 2020/0099914 A1* | 3/2020 | Otsubo | H04N 13/239 | |
| 2021/0044732 A1* | 2/2021 | Wouter | H04N 23/90 | |
| 2021/0136301 A1* | 5/2021 | Koizumi | H04N 25/40 | |
| 2021/0235010 A1* | 7/2021 | Wallace | H04N 23/90 | |
| 2022/0078350 A1* | 3/2022 | Kanma | H04N 23/661 | |
| 2022/0182213 A1* | 6/2022 | Han | G01C 21/28 | |
| 2022/0343463 A1* | 10/2022 | Kappel | H04N 1/3935 | |

* cited by examiner

SYNCHRONIZING STEREOSCOPIC CAMERAS USING PADDING DATA SETTING MODIFICATION

BACKGROUND

Field of the Invention

The field of the invention is camera synchronization, or, more specifically, methods, apparatus, autonomous vehicles, and products for synchronizing stereoscopic cameras using padding data setting modification.

Description of Related Art

Stereoscopic vision using images captured by two cameras may be used in autonomous driving systems. In order to accurately capture the environment using these two cameras, the frames from each camera should be captured as close to simultaneously as possible.

SUMMARY

Synchronizing stereoscopic cameras using padding data setting modification may include receiving a first frame from a first camera and a second frame from a second camera; calculating a differential between a first time corresponding to the first frame and a second time corresponding to the second frame; determining whether the differential exceeds a threshold; and increasing, responsive to the differential exceeding the threshold, a frame rate of the first camera relative to the second camera by transmitting a padding data instruction to the first camera or the second camera.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
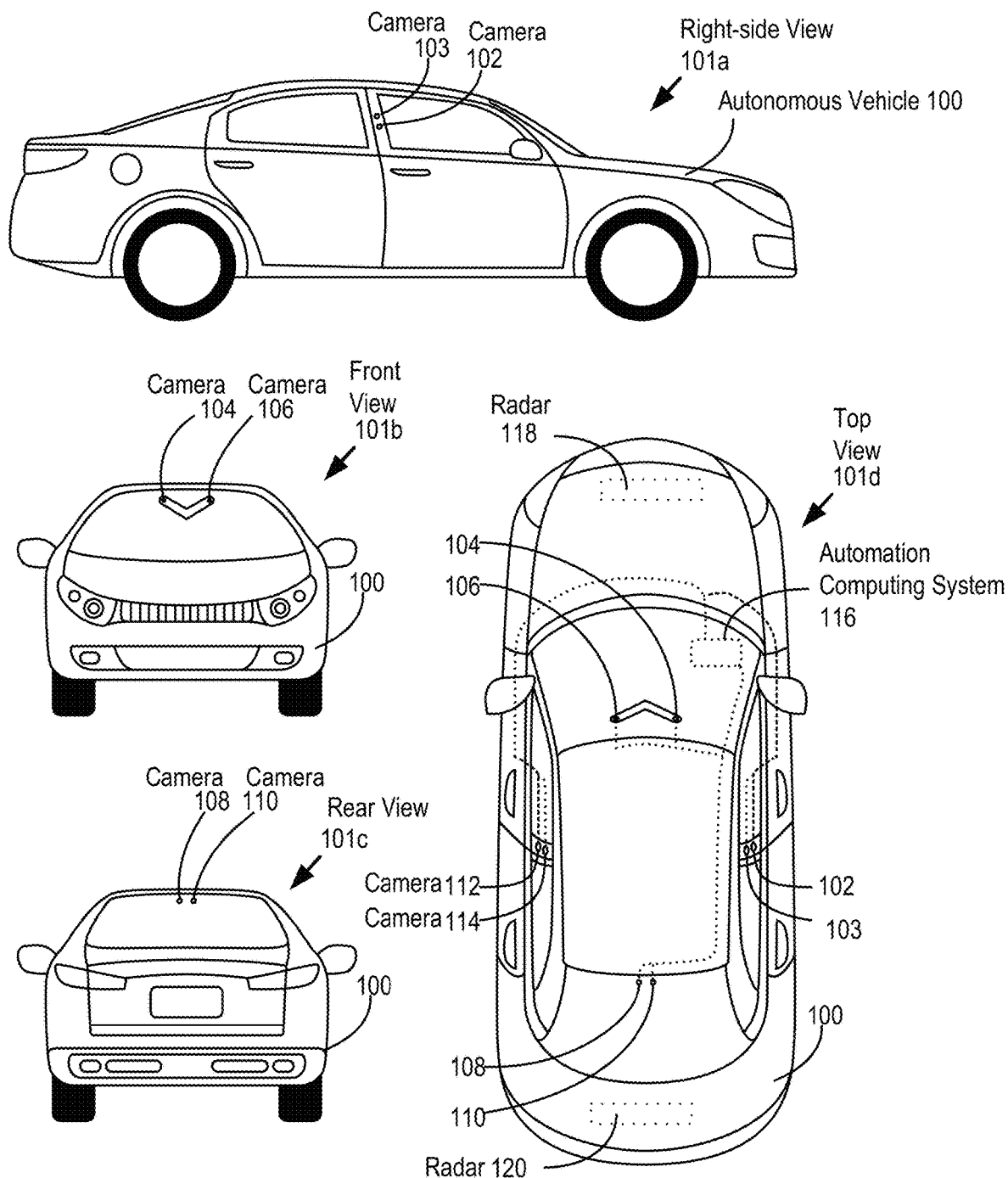
FIG. 1 shows example views of an autonomous vehicle for synchronizing stereoscopic cameras using padding data setting modification according to some embodiments of the present disclosure according to some embodiments of the present disclosure.

Synchronizing stereoscopic cameras using padding data setting modification may be implemented in an autonomous vehicle. Accordingly, FIG. 1 shows multiple views of an autonomous vehicle 100 configured for synchronizing stereoscopic cameras using padding data setting modification according to embodiments of the present disclosure. Right side view 101a shows a right side of the autonomous vehicle 100. Shown in the right-side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a top side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation). The automation computing system 116 may also capture and store sensor data. Operational data of the autonomous vehicle may also be stored in association with corresponding sensor data, thereby indicating the operational data of the autonomous vehicle 100 at the time the sensor data was captured.

Also shown in the top view 101d is a radar sensor 118. The radar sensor 118 uses radio waves to detect objects in the environment relative to the autonomous vehicle 100. The radar sensor 118 may also detect or track various attributes of such objects, including distance, velocity, angle of movement and the like. The measurements of the radar sensor 118 may be provided as sensor data (e.g., radar data) to the automation computing system 116.

The radar data from the radar sensor 118 may be used in a variety of ways to facilitate autonomous driving functionality. As an example, the radar sensor 118 may be used in isolation or in conjunction with other sensors, such as camera sensors, to track persistence of various objects. As described herein, persistence includes determining that a particular object identified at a particular instance (e.g., in camera sensor data, in radar sensor 118 data, or both) is the same object in subsequent instances. The radar sensor 118 may also facilitate detecting the size, shape, type, or speed of particular objects. These detected attributes may be correlated with or used to verify estimations of these attributes from camera sensors. As a further example, the radar sensor 118 may facilitate detecting voids in the environment where no object is present.

The radar sensor 118 provides several differences than other sensors operating in detecting the environment relative to the autonomous vehicle 100. For example, the radar sensor 118 may provide for greater accuracy at longer distances. The radar sensor 118 may also provide for greater precision and more accurate estimations of velocity or movement of objects relative to other sensors. Moreover, as the radar sensor 118 does not operate in the optical spectrum, performance degradation of the radar sensor 118 in inclement weather is lesser than with camera sensors. Radar sensors 118 also provide some level of vertical resolution in some embodiments, with a tradeoff between distance and vertical resolution.

In some embodiments, the autonomous vehicle 100 may also include an additional radar sensor 120. For example, where the radar sensor 118 is positioned at a front bumper of the autonomous vehicle, the autonomous vehicle 100 may also include the additional radar sensor 120 positioned at the rear bumper. Such an additional radar sensor allows for multispectral (e.g., both visual and radar) coverage of the environment at the rear of the car. This provides advantages over ultrasonic sensors at the rear bumper which generally have a limited distance relative to radar.

Although the autonomous vehicle 100 if FIG. 1 is shown as car, it is understood that autonomous vehicles 100 configured for synchronizing stereoscopic cameras using padding data setting modification may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Synchronizing stereoscopic cameras using padding data setting modification in accordance with the present disclosure is generally implemented with computers, that is, with automated computing machinery. For further explanation, therefore, FIG. 2 sets forth a block diagram of automated computing machinery comprising an exemplary automation computing system 116 configured for synchronizing stereoscopic cameras using padding data setting modification according to specific embodiments. The automation computing system 116 of FIG. 2 includes at least one computer Central Processing Unit (CPU) package 204 as well as random access memory 206 (RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors. As described herein, cameras may include a solid state sensor 212 with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other commands. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116, the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or any combination of these). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 224) prior to upload to an execution environment 227. Such operations can include filtering, compression, encoding, decoding, or other operations. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. Each instance of virtual machine 229 may host the same operating system or one or more different operating systems. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation modules 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others. For example, the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Although the example included in the preceding paragraph relates to an embodiment where the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. The time constraint may not necessarily be in real-time, but instead with the highest or one of the highest priorities so that operations indicated for a real-time modality are executed faster than operations without such a priority. For example, as the automation module 220 must make determinations as to operational commands to facilitate autonomous operation of a vehicle. Accordingly, the automation module 220 must make such determinations within one or more time constraints in order for autonomous operation to be performed in real-time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constraints, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
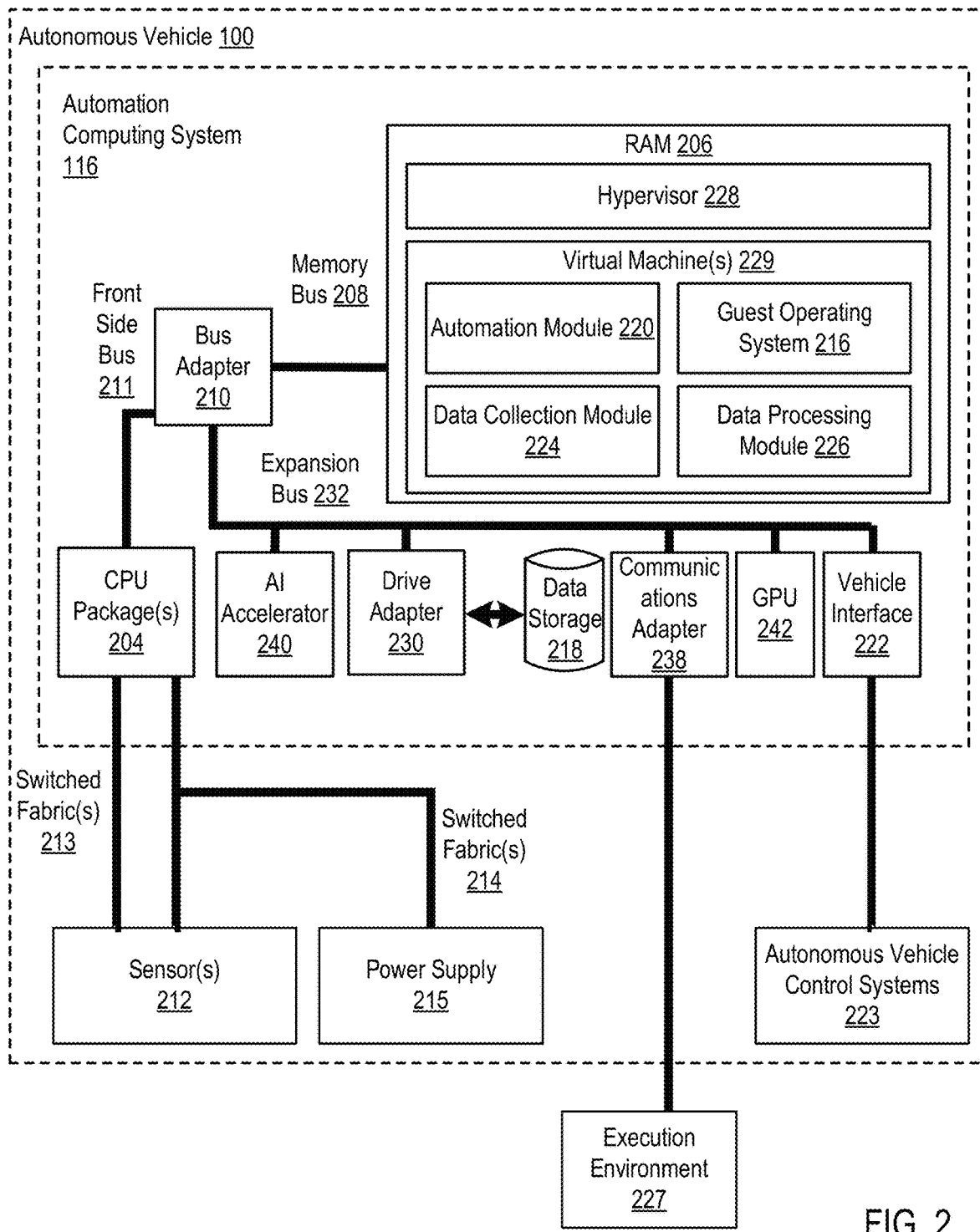
FIG. 2 is a block diagram of an autonomous computing system for synchronizing stereoscopic cameras using padding data setting modification according to some embodiments of the present disclosure.

The automation module 220, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for synchronizing stereoscopic cameras using padding data setting modification according to various embodiments include Integrated Drive Electronics (IDE') adapters, Small Computer System Interface (SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for synchronizing stereoscopic cameras using padding data setting modification according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
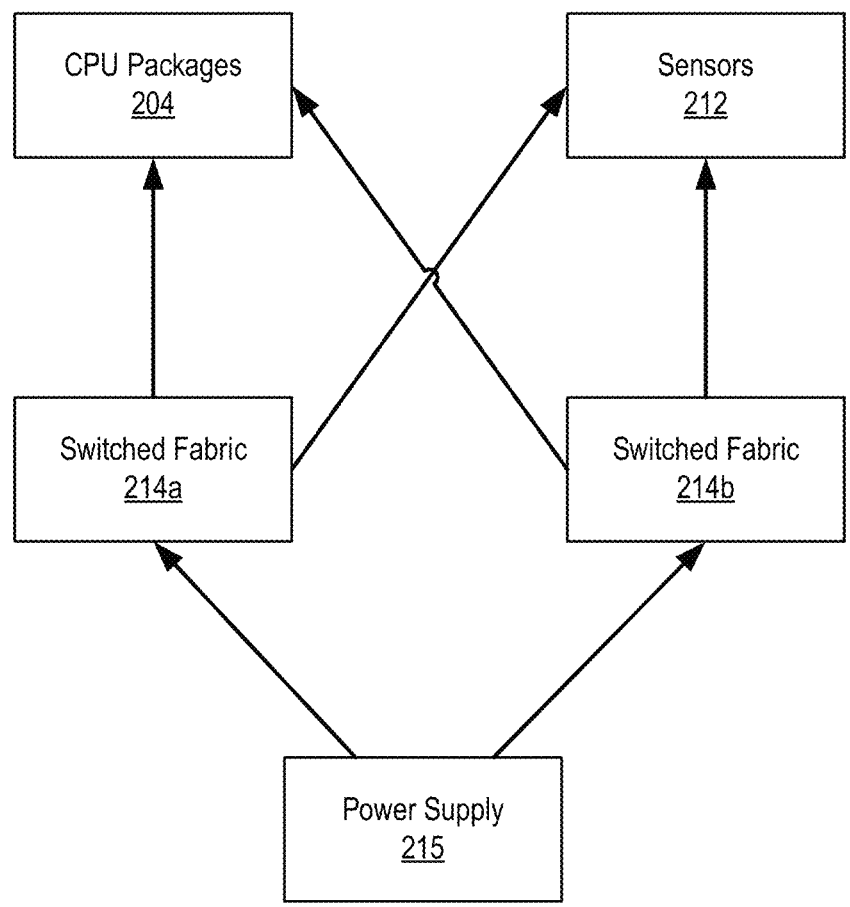
FIG. 3 is a block diagram of a redundant power fabric for synchronizing stereoscopic cameras using padding data setting modification according to some embodiments of the present disclosure.

FIG. 3 shows an example redundant power fabric for synchronizing stereoscopic cameras using padding data setting modification. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIDI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, the approach shown by FIG. 3 can be modified to include three, four, five, or more switched fabrics 214.

Figure 4:
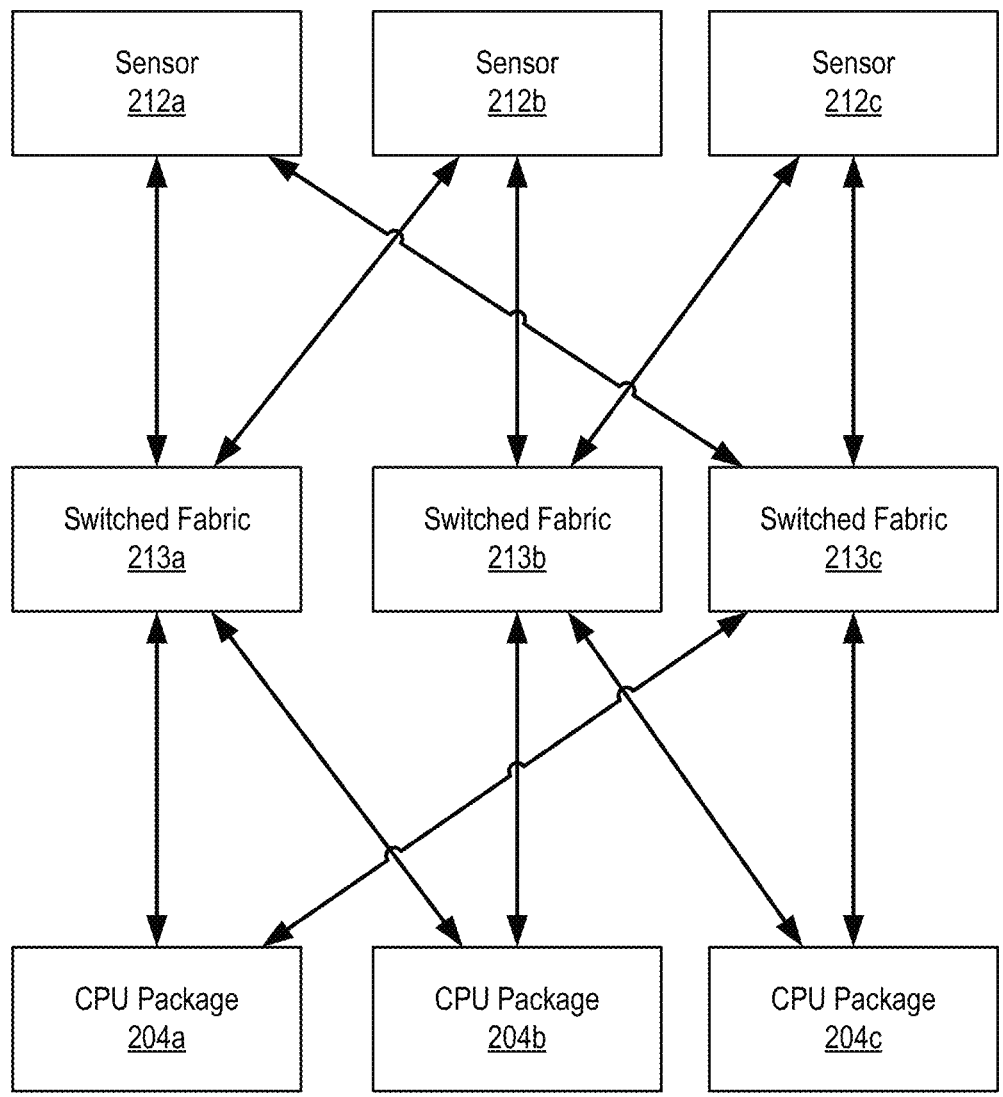
FIG. 4 is a block diagram of a redundant data fabric for synchronizing stereoscopic cameras using padding data setting modification according to some embodiments of the present disclosure.

FIG. 4 is an example redundant data fabric for synchronizing stereoscopic cameras using padding data setting modification. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy.

Figure 5:
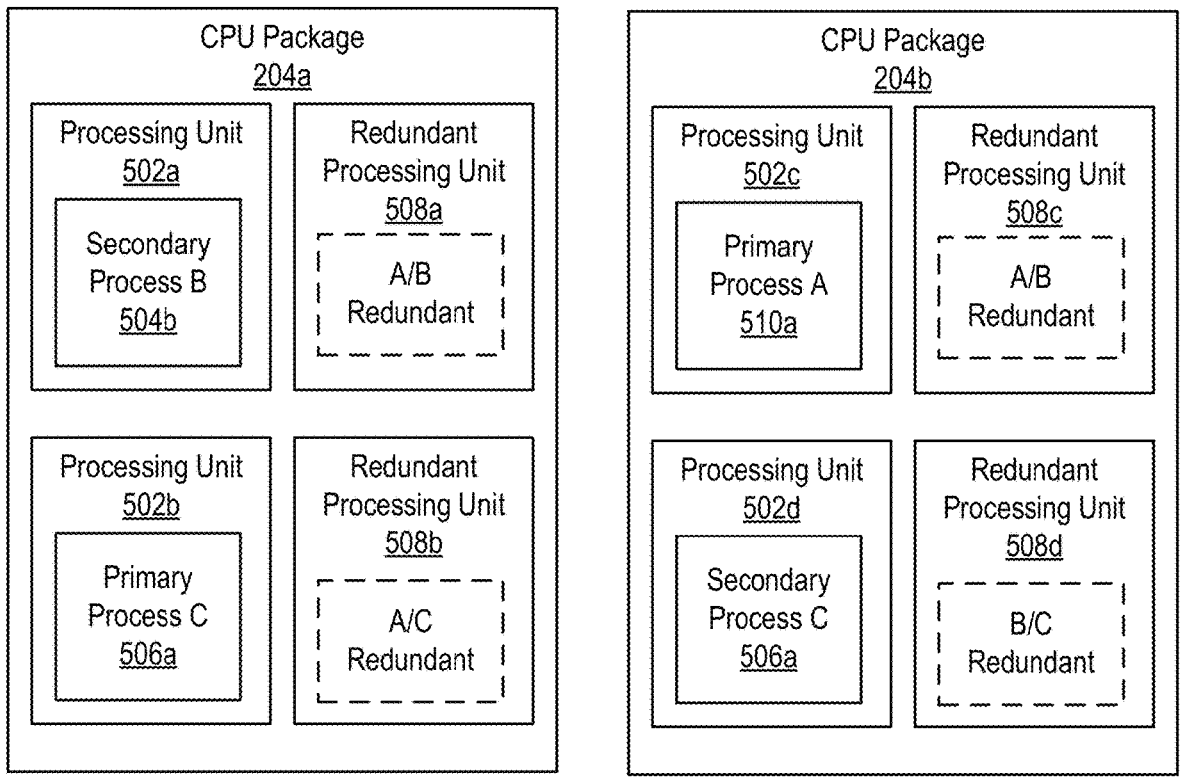
FIG. 5 is an example view of process allocation across CPU packages for synchronizing stereoscopic cameras using padding data setting modification according to some embodiments of the present disclosure.
Figure 5:
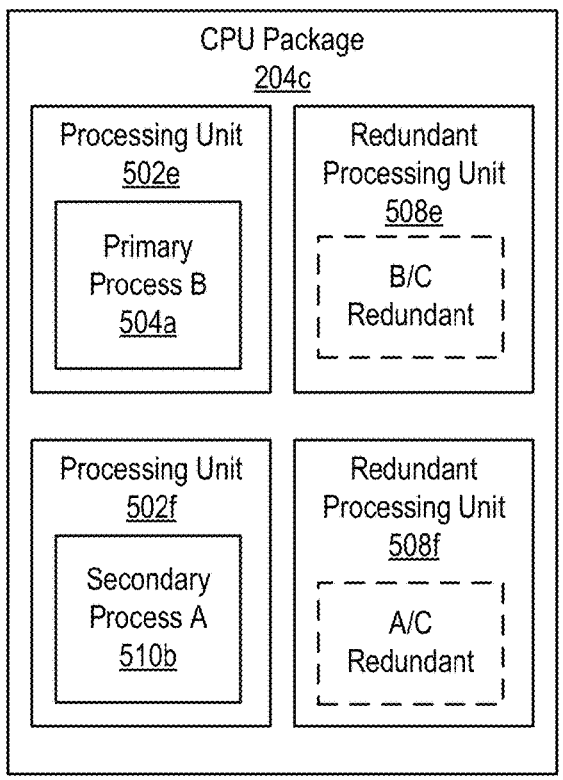

FIG. 5 is an example view of process allocation across CPU packages for synchronizing stereoscopic cameras using padding data setting modification. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "A/B redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a—f allow for allocation of primary or secondary execution of a process in the event of processing unit failure. This further prevents errors caused by processing unit failure as parallel primary and secondary execution of a process may be restored. The number of CPU packages, processing units, redundant processing units, and processes may be modified according to performance requirements while maintaining redundancy.

Figure 6:
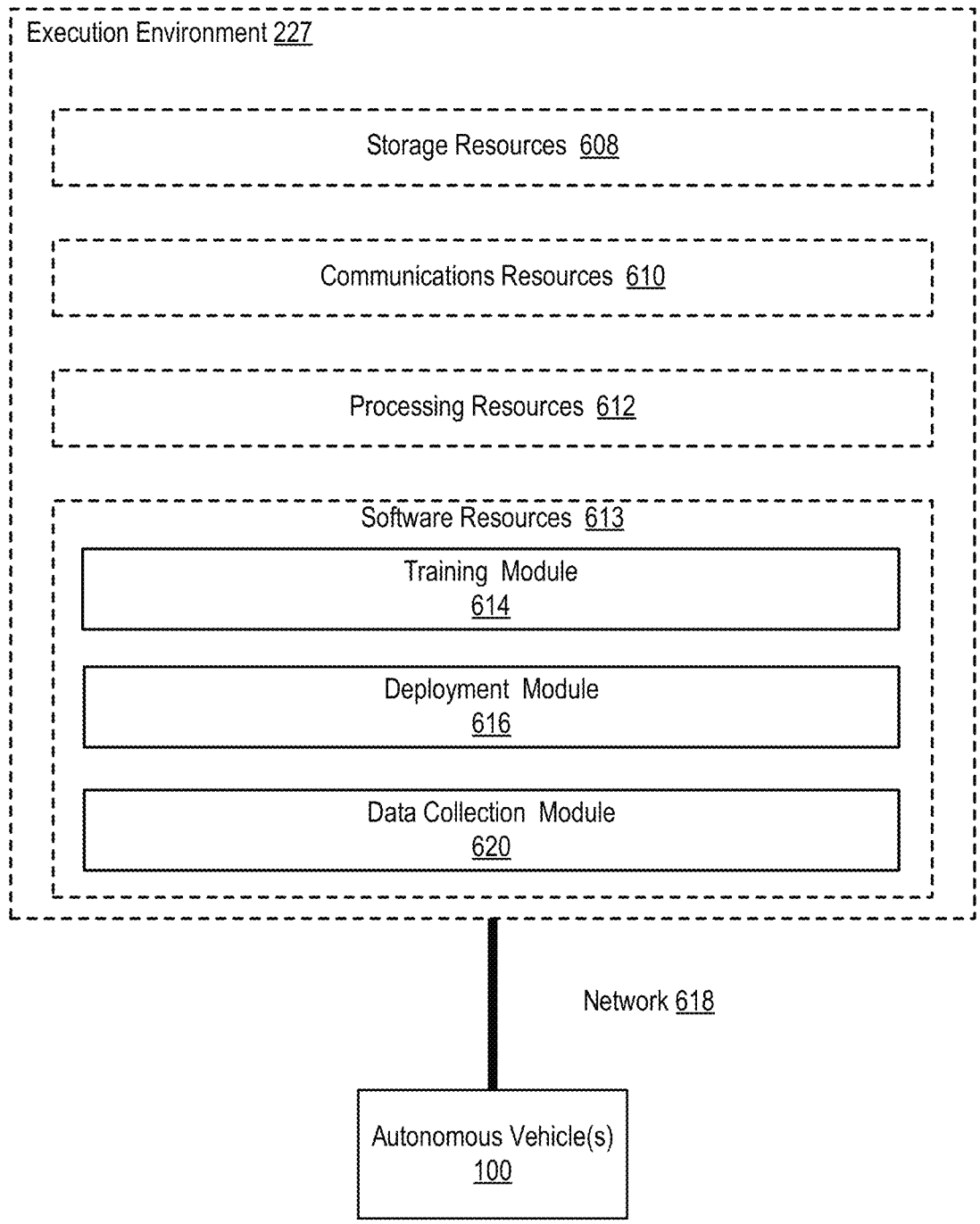
FIG. 6 is an example view of an execution environment for synchronizing stereoscopic cameras using padding data setting modification according to some embodiments of the present disclosure.

For further explanation, FIG. 6 sets forth a diagram of an execution environment 227 in accordance with some embodiments of the present disclosure. The execution environment 227 depicted in FIG. 6 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combinations thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel (FC) technologies, FC over ethernet (FCoE) technologies, InfiniBand (TB) technologies, NVM Express (NVMe) technologies and NVMe over fabrics (NVMeoF) technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 612. The processing resources 612 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Autonomous vehicles such as those described herein, as well as other autonomous devices such as drones, robots, and the like, may use stereoscopic vision to perceive the surrounding environment. For example, the use of stereoscopic vision may allow for estimating the distance, speed, or other motion-related attributes of objects in the environment. Stereoscopic vision requires the use of at least two camera sensors facing the same or similar directions (e.g., capturing substantially overlapping images, sharing a substantially same field of view). Pairs of frames from these camera sensors should be captured as close to simultaneously as possible so that any instance captured by this pair of frames include objects in the environment at the same position. For example, a three-dimensional (3D) camera may have a pair of camera sensors that are driven by a same clock signal or are otherwise synchronized to a same source to ensure that each camera sensor is capturing a respective frame of a frame pair at substantially the same time.

In contrast, implementations that use two separate cameras for stereoscopic vision may not be synchronized to or driven by a same signal and are instead driven by respective internal clock signals. For example, an autonomous vehicle may use two commercial off-the-shelf (COTS) cameras not explicitly configured or designed for stereoscopic vision. As it is difficult to ensure that both cameras are started at the same time, there will inevitably be some delay between when each camera captures a frame for a given pair of frames. Accordingly, this delay should be minimized or kept under some operational bound in order to ensure proper stereoscopic functionality. However, some events such as frame dropping, hardware error, communications link errors, and the like may cause this delay to increase. For example, while one camera operates at a consistent frame rate, another camera may drop a frame and begin capturing a new frame, introducing an increased delay between the cameras. As another example, one or more of the cameras may be operating off of a defined frame rate (e.g., one camera is fast and one is slow, both are fast, or both are slow relative to the defined frame rate). As a further example, where each camera operates using separate clock oscillators, there may be a small difference between their speeds that may add up over time. Other errors or faults may also cause cameras to desynchronize. For example, a camera may clip a frame that it is capturing, ending capture of the frame early and immediately beginning capture of a new frame. Jitters within an imaging signal processor (ISP), such as in a Camera Serial Interface (CSI) decoder path, may also cause cameras to desynchronize over time. Environmental factors may affect functionality of a camera, such as heat affecting a clock oscillator, thereby causing cameras to desynchronize over time.

Figure 7:
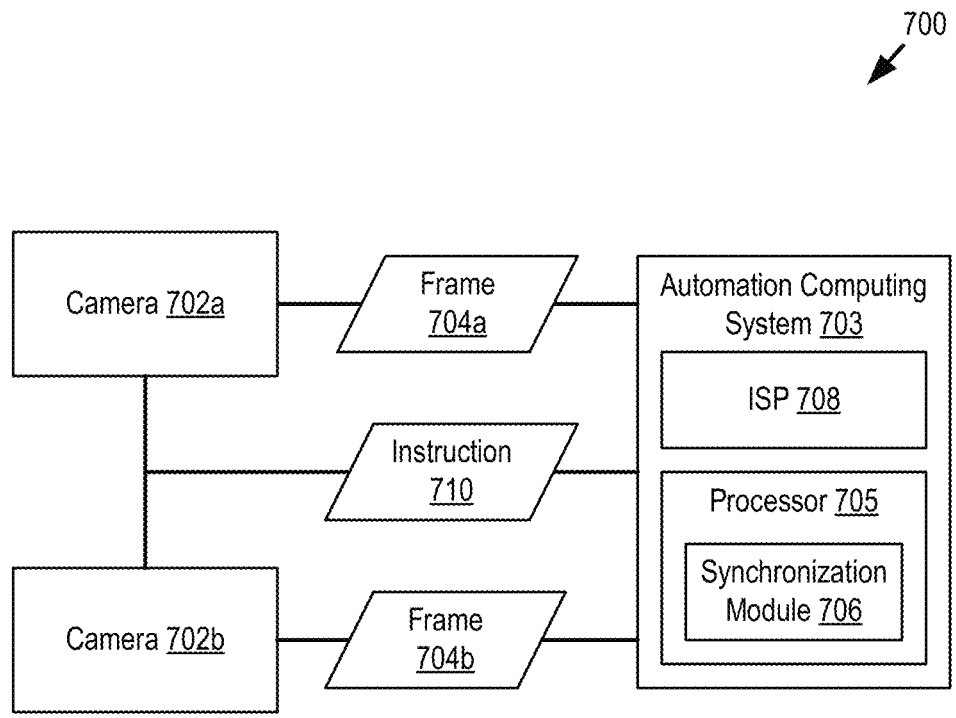
FIG. 7 is an example view of an example system for synchronizing stereoscopic cameras using padding data setting modification according to some embodiments of the present disclosure.

To address these concerns, FIG. 7 sets forth an example system 700 for synchronizing stereoscopic cameras using padding data setting modification according to some embodiments of the present disclosure. Although the example system 700 and the following discussion is described in the context of an autonomous vehicle (e.g., an autonomous vehicle 100 as set forth above), the approaches set forth herein are also applicable to any use case requiring stereoscopic vision including autonomous drones, autonomous robots or other machinery, and the like.

The system 700 includes cameras 702a,b. Particularly, the cameras 702a,b are distinct camera modules in contrast to three-dimensional cameras that include two synchronized camera modules in the same device. The cameras 702a,b are installed in a stereoscopic configuration relative to each other and provide stereoscopic vision on some ego vehicle on which they are installed, such as an autonomous vehicle 100. For example, the cameras 702a,b may be installed to capture an environment relative to the autonomous vehicle 100 at a same facing (e.g., front facing, side facing, or rear facing). Each camera 702a,b may include respective sets of lenses, shutters, and other components to facilitate capturing of frames 704a,b. Each camera 702a,b may also include other respective components, such as inertial measurement units (IMUs). The cameras 702a,b are operatively coupled to an automation computing system 703. The automation computing system 703 may be similar to the automation computing system 116 as described above. For example, the automation computing system 703 may facilitate in processing image data from the cameras 702a,b, as well as potentially other cameras or other sensors, to perform autonomous driving functionality. Accordingly, the automation computing system 703 may include additional modules, software components, hardware components, and the like that are not explicitly shown or described herein.

Each camera 702a,b is configured to capture and provide a respective frame 704a,b at a defined frame rate (e.g., thirty frames-per-second (FPS)) at a defined resolution (e.g., 3849×2160 (4K), 7680×4320 (8K), and the like). As an example, in some embodiments, each camera 702a,b implements a rolling shutter to capture optical imagery for encoding into a particular frame 704a,b. In some embodiments, each camera 702a,b assigns time data such as a timestamp to a respective frame 704a,b indicating a time at which the frame 704a,b was captured or encoded by the camera 702a,b. In some embodiments, the frames 704a,b are received by an image signal processor (ISP) 708. In some embodiments, the ISP 708 may remove padding data from a received frame 704a,b. In some embodiments, the ISP 708 performs one or more operations or transformations on the frames 704a,b such as noise reduction, color correction, format conversion, and the like prior to providing the frames 704a,b to a processor 705. In other embodiments, the ISP 708 may refrain from performing one or more of these transformations and provide the frames 704a,b to the processor 705. For example, the ISP 708 may remove the padding data from a frame 704a,b but perform minimal subsequent transformations, such as a format conversion, so as to provide only raw or near-raw active pixel frame 704a,b data to a downstream component. As a further example, the processor 705 may perform these transformations without the aid of an ISP 708. In some embodiments, providing the frames 704a,b to the processor 705 includes storing the frames 704a,b in memory, cache, a buffer, or other storage location accessible to the processor 705. Accordingly, in some embodiments, a frame 704a,b is considered to be "received" by the automation computing system 703 when made available to the processor 705.

The processor 705 implements or executes a synchronization module 706, a module for synchronizing stereoscopic cameras using padding data setting modification according to some embodiments of the present disclosure. The synchronization module 706 assigns a time stamp to each frame 704a,b corresponding to a time at which a given frame 704a,b was received. The time at which a given frame 704a,b is received may be determined by a variety of components. For example, the time at which a frame 704a,b is received may be determined by a processor 705, an image signal processor (ISP), any camera, radar, sensor, or potentially any other component of the automation computing system 703. In some embodiments where many (e.g., more than two) cameras 702a,b are to be synchronized, one of the cameras 704a,b may serve as a reference source of time for other cameras 702a,b. Accordingly, the approaches set forth herein may instead be applied using time differentials between the times frames 704a,b are captured by respective cameras 702a,b as compared to the time of some reference camera 702a,b. The synchronization module 706 then determines whether the cameras 702a,b are synchronized based on the corresponding time stamps for when the frames 704a,b were received. Particularly, the synchronization module 706 determines whether the cameras 702a,b are synchronized based on the time stamps corresponding to when the frames 704a,b were received, not time stamps or other time data corresponding to when the frames 704a,b were captured by the respective cameras 702a,b. As another example, another sensor such as a radar sensor may serve as a source of time.

For example, the synchronization module 706 determines whether the cameras 702a,b are synchronized by calculating a differential between the time stamps for when the frames 704a,b were received. Should the differential fall below a threshold, the cameras 702a,b are considered synchronized and the synchronization module 706 takes no action to modify the frame rates of either camera 702a,b. In other words, although the frames 704a,b may not be received at the exact same instance in time, the cameras 702a,b are considered synchronized if the difference in the arrival time of the frames 704a,b falls below the threshold.

In some embodiments, the threshold may be defined based on one or more attributes of a frame 704a,b. For example, the threshold may be defined as a line length (e.g., an amount of time to encode one row of a frame 704a,b) multiplied by some factor. Continuing with this example, for a line length of 16 μs and a factor of six, the threshold may be defined as 16×6=96 μs. The threshold and the factor may be based on engineering or design considerations, such as an amount of time (e.g., a delay) for a camera 702a,b to receive, process, and apply a received instruction 710. Other criteria may also be used to define the threshold.

Should the differential exceed the threshold, the cameras 702a,b are considered out of sync. For example, in some embodiments, the cameras 702a,b are considered out of sync in response to the differential for any corresponding pair of frames exceeding the threshold. As another example, in some embodiments, the cameras 702a,b are considered out of sync in response to the differentials for some number of frame 704a,b pairs (e.g., consecutive frame 704a,b pairs or non-consecutive frame 704a,b pairs within some window) exceeding the threshold. In some embodiments, multiple thresholds may be used to determine if the cameras 702a,b are out of sync. For example, assuming a first threshold and a second threshold higher than the second threshold, the cameras 702a,b may be considered out of sync in response to the differentials for some number of frame 704a,b pairs exceeding the first threshold or the differentials for a lesser number of frame 704a,b pairs (e.g., a single pair of frames 704a,b) exceeding the second threshold. For example, assume a first threshold of threshold of 100 μs and a second threshold of threshold of 150 μs. In this example, the cameras 702a,b may be considered out of sync in response to the differentials of N frame 704a,b pairs exceeding the first threshold or in response to a single differential (e.g., the differential for the most recently received frames 704a,b) exceeding the second threshold.

In response to the determination that the cameras 702a,b are out of sync, the synchronization module 706 resynchronizes the cameras 702a,b by modifying the padding data setting of a camera 702a,b (e.g., the camera 702a,b whose frame 704a,b arrived later), thereby modifying the frame rate of that camera 702a,b. For example, the synchronization module 706 may send a instruction 710 to a camera 702a,b that causes the padding data setting of the camera 702a,b to be reduced, thereby increasing the frame rate of that camera 702a,b. As another example, the synchronization module 706 may send a instruction 710 to a camera 702a,b that causes the padding data setting of the camera 702a,b to be increased, thereby reducing the frame rate of that camera 702a,b.

Figure 13:
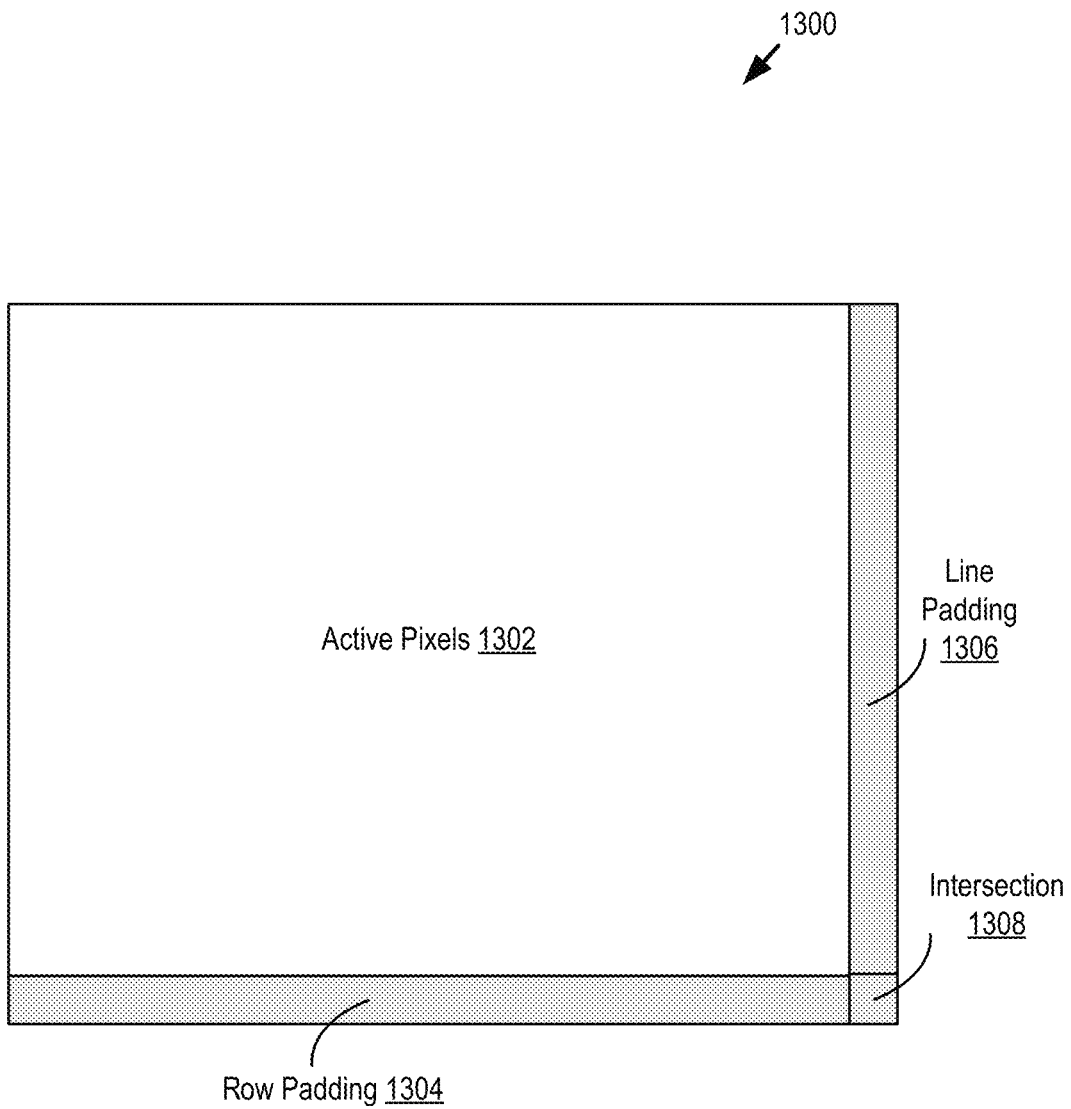
FIG. 13 is diagram of an example frame for synchronizing stereoscopic cameras using padding data setting modification according to some embodiments of the present disclosure.

As described herein, a padding data setting of a camera 702a,b refers to the number of lines or rows of padding data encoded the camera 702a,b into a given frame 704a,b. Accordingly, a camera 702a,b will encode an amount of padding data into a frame 704a,b as defined by the padding data setting. Referring to the example frame 1300 shown in FIG. 13, a given frame is encoded by a camera as a two-dimensional array of pixels including multiple rows of pixels. The frame 1300 includes a subset or subarray of active pixels 1302. The active pixels 1302 encode image data of light captured by the camera 702a,b. Accordingly, the active pixels 1302 serve to encode the actual image captured by the camera 702a,b. The frame 1300 also includes one or more rows or columns of padding data. In some embodiments, the padding data may include row padding 1304, which includes one or more rows of padding data added to the end of a frame 1300. In some embodiments, the padding data may include line padding 1306, which are pixels added to each row of active data 1302 to form one or more vertical lines (e.g., columns) of padding data. In embodiments where both row padding 1304 and line padding 1306 are used, some portions of the frame 1300 may include intersections 1308 of row padding 1304 and line padding 1306. The padding data may be included before the active pixels 1302, after the active pixels 1302, or both for line padding or row padding. The padding data setting may be modified to modify an amount of row padding 1304 or line padding 1306 in a frame 1300 independent of each other, individually or in combination.

Padding data is used to allow a bus or processing unit to catch up to data such that there is sufficient time to transmit or process the data. As an example, line padding 1306 may be used to allow processing or transfer of image data for a line before a subsequent line is processed or transferred. As another example, row padding 1304 may be used to allow for the process or transfer of image data for a frame 1300 before a subsequent frame 1300 is processed or transferred. The padding data (e.g., row padding 1304 or line padding 1306) may include null or non-image related data. That is, the padding data may not contribute to the production of color for its respective image.

In some embodiments, the instruction 710 may be sent using a low-level Application Program Interface (API) exposed by the camera 702a,b. For example, the low-level API may be implemented at the firmware level or other level of the camera 702a,b. Such an API is considered low-level in that it is executing on a lower layer relative to an operating system layer or other system layer. By modifying the frame rate of an out of sync camera 702a,b and thereby causing the cameras 702a,b to operate at different frame rates, the arrival times for the respective frames 704a,b converge such that the differential in arrival times falls below some threshold as described above. After convergence, the cameras 702a,b are considered synchronized and may then resume operating at a same frame rate.

Some cameras 702a,b may be configurable to operate at a variable frame rate where the frame rate may be modified by modifying a clock signal that drives the cameras 702a,b or other approaches. However, such frame rate modification may require adjustments at larger degrees of granularity, such as in single frame-per-second increments. In other words, a FPS value may be incremented or decremented by some integer value (e.g., from thirty FPS to thirty-one FPS, thirty-two FPS, to twenty-nine FPS, and the like). However, modifying a frame rate to this degree may be inadequate to compensate for comparatively small differentials. For example, increasing a frame rate from thirty FPS to thirty-one FPS will cause frames 704a,b to arrive approximately $\frac{1}{30}^{th}$ of a second faster (e.g., 33.333 milliseconds faster). However, the threshold for determining whether cameras 702a,b are synchronized may be much smaller than $\frac{1}{30}^{th}$ of a second, such as 100 μs. In other words, adjusting frame rates in single FPS increments allows for frames to arrive faster on the scale of tens of milliseconds, whereas the differential that needs to be compensated for may be on the scale of microseconds.

Instead, the instruction 710 causes a frame rate to be modified by modifying the padding data setting of frames 704a,b generated by the camera 702a,b. For example, for a camera 702a,b to capture a frame 704a,b at 4208×3120 resolution and thirty FPS, the camera 702a,b must capture 3120 rows of pixels and encode some amount of padding data (e.g., sixteen rows) within $\frac{1}{30}^{th}$ of a second including a vertical blanking interval (VBI), the time between capturing the final visible line of a frame 704a,b and beginning capture of the first visible line of a next frame 704a,b. After capturing the last line of the frame 704a,b, the frame 704a,b is then output by the camera 702a,b.

For cameras 702a,b using a rolling shutter, the exposure for each row of pixels in a frame 704a,b is initiated sequentially. For example, for a first row, a line reset is performed before an exposure begins. After the line set of the first row is performed, during the exposure for the first row, a line reset is performed for a second row and exposure for the second row begins concurrent to exposure to the first row. This process continues until the line reset and exposure for the last row begins. Accordingly, as capture for each row starts sequentially, the time required capture a row of a given frame 704a,b would be approximately the frequency of the frame rate setting divided by the number of rows per frame 704a,b. For example, assuming a frame rate of thirty FPS and a resolution of 4208×3120 and sixteen rows of padding data, each row (both active and blanking) would require approximately ($\frac{1}{30}$)/3136 seconds to capture (e.g., 1/94080 seconds or 10.63 μs).

As a given frame 704a,b is output by a camera 702a,b after encoding all rows, reducing the number of rows to be encoded (e.g., by reducing the number of padding data rows encoded) would necessarily cause the frame 704a,b to be output sooner, thereby increasing the frame rate of that camera 702a,b without modifying any clock signals for that camera 702a,b. Similarly, an increase in the number of padding data rows encoded would cause a frame 704a,b to be output later, thereby reducing the frame rate. This allows the frame rate of the camera 702a,b to be modified at a microsecond scale.

Consider an example with two cameras 702a,b operating at thirty FPS and at 4208×3120 resolution with sixteen rows of padding data. Assume that a first camera 702a provides a first frame 704a at time $t_1$ and a second camera 702b later provides a second frame 704b at time $t_2$. Further assume that the differential between $t_1$ and $t_2$ (e.g., $t_1-t_2$) is 200 μs and the cameras 702a,b are determined to be out of sync in response to the differential exceeding a threshold of 100 μs. By reducing the padding data setting by ten rows, a frame 704b from second camera 702b at this reduced padding data setting will arrive 106 μs faster. A next frame 704b at the original padding data setting would then arrive 96 μs after the corresponding frame 704a, thereby reducing the differential to below the threshold. Thus, the differential is overcome and the cameras 702a,b are resynchronized via a single frame 704b at the reduced padding data setting.

Consider another example similar to that above, except that the padding data setting of the camera 702b is instead reduced by two rows. In this example, the camera 702b would need to send five frames 704b at the reduced padding data setting with each frame 704b reducing the differential between pairs of frames 704a,b by approximately 53.14 μs. In other words, the padding data setting may be reduced so that a differential may reduce to below a threshold across a single frame 704a,b or across multiple frames 704a,b depending on particular operating conditions. The number of frames 704a,b required to be sent at a modified padding data setting in order to resynchronize the cameras 702a,b is hereinafter referred to as a number of resync frames 704a,b. The particular number of resync frames 704a,b used or required to resynchronize the cameras 702a,b may vary based on design considerations as well as the degree to which the cameras are out of sync. For example, the synchronization module 706 may modify padding data settings in order to synchronize the cameras 702a,b across targeted number of resync frames 704a,b. For example, the synchronization module 707 may modify the padding data setting to resynchronize the cameras 702a,b after approximately twenty frames 704a,b in order to keep the transition smoother. As another example, the synchronization module 707 may modify the padding data setting to resynchronize the cameras 702a,b after fewer frames 704a,b (e.g., six) in order to resynchronize the cameras 702a,b faster.

Although the examples presented herein describe increasing a frame rate of a camera 702a,b by reducing the padding data setting, the approaches set forth herein are also applicable to reducing the frame rate of a camera 702a,b by increasing the padding data setting. For example, assuming that a frame 704a is received from a first camera 702a and then a second frame 704b is later received from a second camera 702b after some time exceeding a threshold, the frame rate of the first camera 702a may be reduced by increasing the padding data setting of the first camera 702a. As frames 704a from the first camera 702a will take longer to encode, this will reduce the time difference between arrival times of frames 704a,b from the cameras 702a,b. Thus, whether a padding data setting is increased or decreased is dependent on which camera 702a,b is to have their padding data setting modified.

In some embodiments, as described above, the modified padding data setting may be based on the differential (e.g., the degree to which the cameras 702a,b are out of sync). For example, assuming a known current padding data setting for a given camera 702a,b and a known current frame rate for that camera 702a,b, the amount of time by which a differential is reduced per row per frame 704a,b may be calculated, hereinafter referred to as a row time savings. The differential may then be divided by the row time savings to determine by how many rows the padding data setting should be modified in order to resynchronize the cameras 702a,b using a single frame 704a,b. The modified padding data setting may also be based on a target resync time (e.g., a target number of resync frames 704a,b for resynchronizing the cameras 702a,b). For example, the differential divided by the row time savings may be further divided by the target resync time to calculate by how many rows the padding data setting should be reduced so as to resynchronize the cameras 702a,b within the target resync time.

As another example, the reduced padding data setting may be determined based on a threshold padding data setting, such as a minimum padding data setting or a maximum padding data setting. The threshold padding data setting may be defined, for example, by constraints of the camera 702a,b, by one or more software modules (e.g., of the automation computing system 703) or otherwise defined. For example, assume that the number of rows by which the padding data setting should be reduced in order to resynchronize the cameras 702a,b in a single frame 704a,b would cause the modified padding data setting to fall below a minimum padding data setting. Accordingly, that number of rows may instead be divided or distributed across multiple frames 704a,b each having a padding data setting exceeding the minimum padding data setting. In other words, the particular number of rows by which a padding data setting is reduced and the number of frames 704a,b using the reduced padding data setting may be determined or customized according to a variety of considerations. For example, cameras 702a,b may be resynchronized faster using greater reductions in padding data setting, but the resulting data may be less useful to downstream components such as those for performing autonomous driving (e.g., for object recognition, distance detection) due to not having enough added processing time or other benefits afforded by adding in padding data to a frame. Conversely, reducing the padding data setting by fewer rows requires more time to resynchronize the cameras 702a,b.

The synchronization module 706 then sends another instruction 710 to the camera 702a,b having the modified padding data setting to restore the padding data setting (e.g., to the padding data setting prior to modification). The instruction 710 to restore the padding data setting may also be sent via a low-level API exposed by the cameras 702a,b or by another approach. As the cameras 702a,b are now synchronized (e.g., in response to the differential falling below a threshold) each camera 702a,b may resume providing frames 704a,b at the original padding data setting. In some embodiments, the instruction 710 to restore the padding data setting is sent in response to receiving a pair of frames 704a,b and determining that the differential has fallen below a threshold.

In some embodiments, the instruction 710 to restore the padding data setting may be sent in anticipation of a known time or frame 704a,b interval at which the differential will fall below the threshold by virtue of the modified padding data setting. For example, in some embodiments, the instruction 710 is sent based on a delay between the synchronization module 706 and the cameras 702a,b. Assume that there is some known delay between when a instruction 710 is sent and when the instruction 710 takes effect in a camera 702a,b. This delay may be expressed as a number of frames 704a,b (e.g., delay frames 704a,b). In other words, after sending a instruction 710 to a camera 702a,b, some number of frames 704a,b will be received that do not reflect the instruction 710.

Accordingly, in some embodiments, the instruction 710 to restore the padding data setting may be based on a number of resync frames 704a,b required to resynchronize the cameras 702a,b. For example, given four delay frames 704a,b and eight resync frames 704a,b, assume that a instruction 710 to modify a padding data setting is sent. The differential will be overcome after receiving twelve frames 704a,b after sending the instruction 710 (four delay frames 704a,b at the original padding data setting and eight resync frames 704a,b at the modified padding data setting). Accordingly, a instruction 710 to restore the padding data setting will be sent after receiving eight frames 704a,b from the time at which the instruction 710 to modify the padding data setting was sent. Thus, the instruction 710 will be to restore the padding data setting will take effect four frames 704a,b later such that the padding data setting will be restored on the thirteenth frame 704a,b.

The approach described above may be repeatedly performed by the synchronization module 706. For example, after receiving each pair of frames 704a,b the synchronization module 706 may calculate a differential and determine if the cameras 702a,b are out of sync. Additionally, the approach described above allows for corrections in camera 702a,b synchronization caused by a variety of components, including the cameras 702a,b, ISP 708, data interconnects or buses, or other components.

In some embodiments, the frames 704a,b may be provided to one or more models. For example, after determining whether the cameras 702a,b are synchronized, the frames 704a,b may be provided to the one or more models independent of whether or not the cameras 702a,b are synchronized. For example, the one or more models may include one or more models facilitating autonomous driving functionality of an autonomous vehicle 100 or autonomous operations of other devices.

The approach described above may be extended to be applicable to any number of cameras. For example, differentials may be calculated for any number of frame pairs (e.g., each relative to a single frame such as a first arrived frame for a grouping of corresponding frames). Any differential exceeding some threshold may then cause the corresponding camera padding data setting to be adjusted in order to resynchronize. As an example, the approaches described above may be applied to multiple externally facing cameras of an autonomous vehicle.

Although the approach described above is described as being performed by a processor 705 separate from an ISP 708, in some embodiments the approaches described above may instead be performed by the ISP 708 itself, or another component. Furthermore, although the approaches above are described with respect to synchronizing cameras, these approaches may be applied to synchronizing other sensors. Such sensors may include sets of like sensors (e.g., of the same type), or sensors of a different type. Accordingly, such non-camera sensors may have their capture rates modified by adjusting an amount or fidelity of sensor data captured at particular intervals or frequencies.

Figure 8:
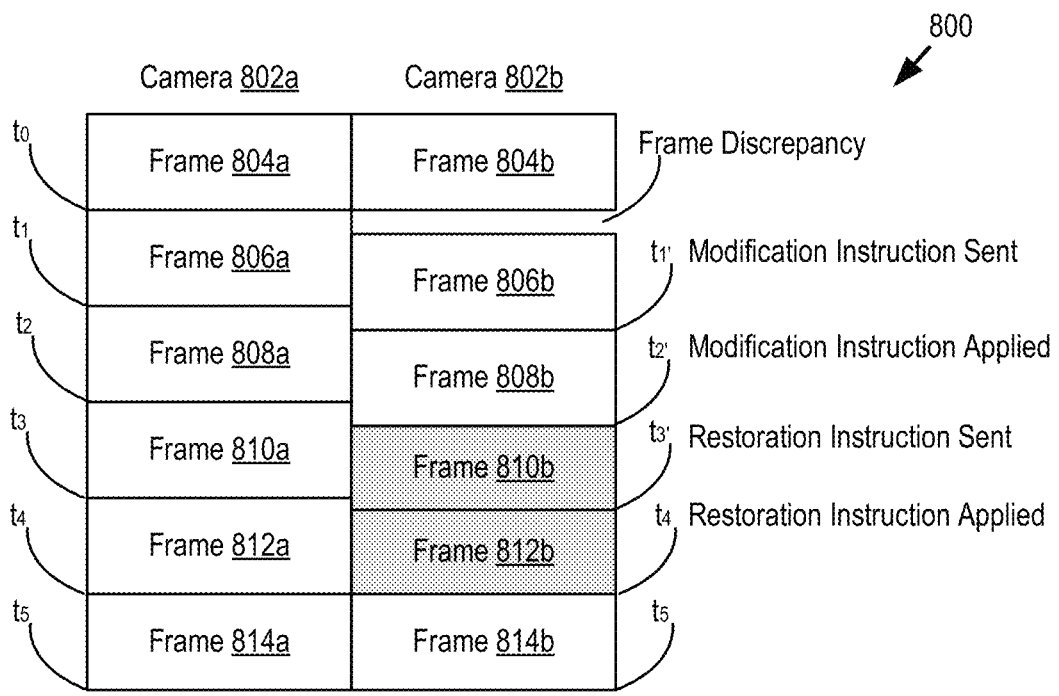
FIG. 8 is an example timing diagram for synchronizing stereoscopic cameras using padding data setting modification according to some embodiments of the present disclosure.

FIG. 8 shows an example timing diagram 800 for synchronizing stereoscopic cameras using padding data setting modification according to some embodiments of the present disclosure. The timing diagram 800 shows timelines for receiving respective frames 804-814a,b from cameras 802a, b. The size of blocks for the frames 804-814a,b Each time code $t_n$ or $t_n'$ corresponds to a time at which a particular frame 804-814a,b was received (e.g., by an automation computing system 703). At to, frames 804a,b are received at substantially the same time. That is, the differential between the reception times of frames 804a,b falls below some threshold. Thus, at time $t_0$, the cameras 802a,b are synchronized.

After time $t_0$, camera 802b experiences a frame discrepancy (e.g., due to a frame drop) and must restart generating frame 806b. Accordingly, while frame 806a is received at time $t_1$, frame 806b is received at time $t_1'$. Here, the differential between $t_1$ and $t_1'$ exceeds the threshold, and therefore the cameras 802a,b are out of sync. Thus, at $t_1'$, a instruction 710 is sent to the camera 802 to reduce its padding data setting and thereby increase its frame rate. The instruction 710 to reduce the padding data setting of the camera 802b is not applied until $t_2'$ (e.g., due to a single frame delay between sending and applying the instruction 710). Accordingly, frames 808a,b arrive at times $t_2$ and $t_2'$, respectively, and are of the same, original padding data setting.

After time $t_2'$, camera 802b is providing frames at a reduced padding data setting. Accordingly, frame 810b and 812b are at the reduced padding data setting as shown by their shading and reduced relative height (not to scale). Frames 810a,b are received at times $t_3$ and $t_3'$, respectively, where the cameras 802a,b are still out of sync. Frames 812a,b are received at the substantially same time $t_4$, indicating that the cameras 802a,b have been resynchronized. Accordingly, frame 814b is received at the same, original padding data setting as frame 814a at time $t_5$.

Here, cameras 802a,b were resynchronized using two resync frames 810b and 812b. Accordingly, assuming a single frame of delay between sending a instruction 710 and a instruction 710 taking effect, an instruction to restore the padding data setting of camera 802b is sent at time $t_3'$, taking effect at time $t_4$ such that frame 814b, received at time $t_5$, is at the restored padding data setting.

Figure 9:
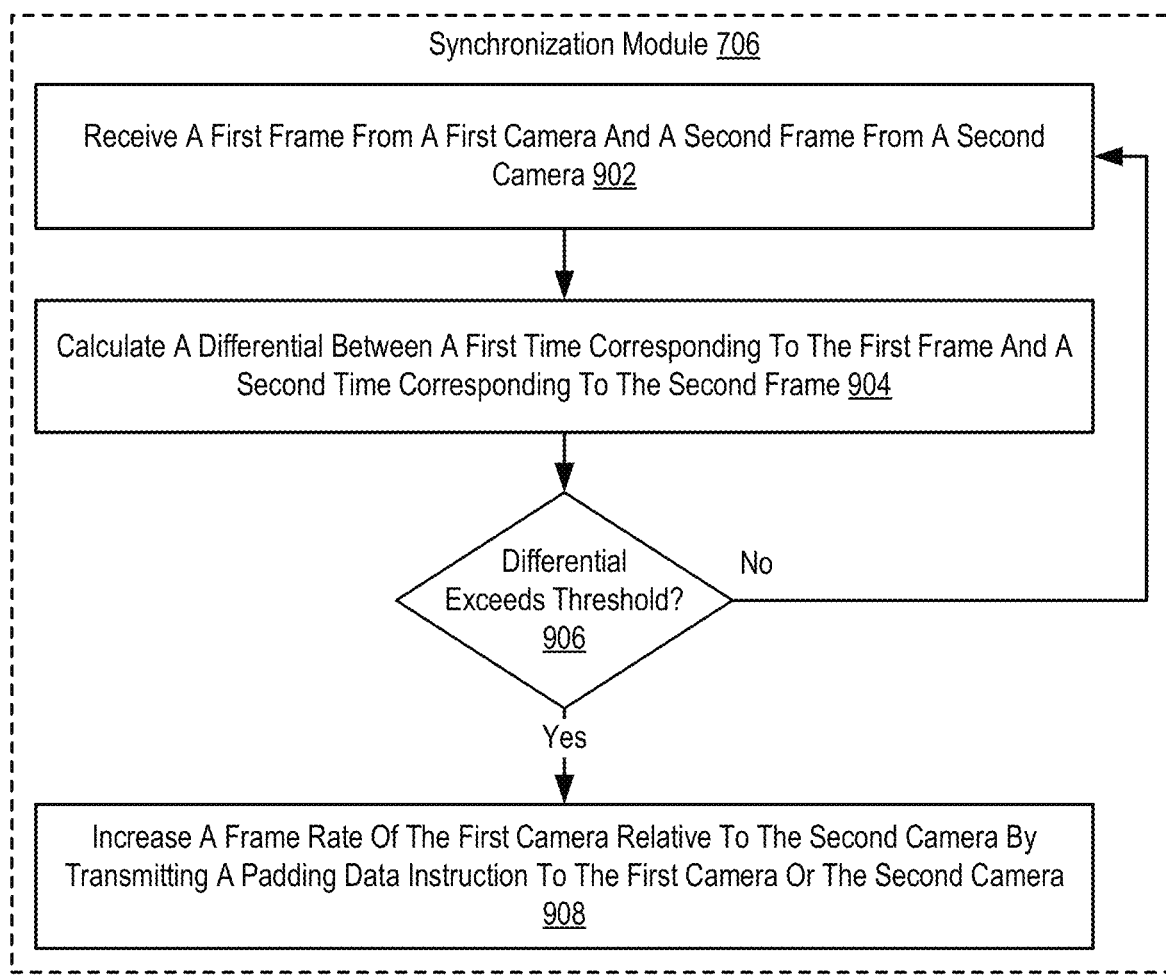
FIG. 9 is a flowchart of an example method for synchronizing stereoscopic cameras using padding data setting modification according to some embodiments of the present disclosure.

For further explanation, FIG. 9 sets forth a flow chart illustrating an exemplary method for synchronizing stereoscopic cameras using padding data setting modification according to some embodiments of the present disclosure. The method of FIG. 9 may be performed, for example, by a synchronization module 706 as described above. The method of FIG. 9 includes receiving 902 a first frame 704a from a first camera 702a and a second frame 704b from a second camera 702b. The first frame 704a and second frame 704b are hereinafter collectively referred to as frames 704a, b. The cameras 702a,b are facing a same direction relative to some ego vehicle, such as an autonomous vehicle 100 and have a similar field of view so as to allow for stereoscopic vision using these cameras 702a,b. Each camera 702a,b may be configured to provide frames 704a,b at a particular frame rate and at a defined resolution. Accordingly, each camera 702a,b may be configured to encode frames 704a,b using a defined padding data setting (e.g., a defined number of rows of padding data encoded per frame). As an example, in some embodiments, each camera 702a,b implements a rolling shutter to capture optical imagery for encoding into a particular frame 704a,b. In some embodiments, each camera 702a,b assigns time data such as a timestamp to a respective frame 704a,b indicating a time at which the frame 704a,b was captured or encoded by the camera 702a,b. The frames 704a,b may be considered received 902 at the time they are made accessible to a processor 705, ISP 708, or other component of an automation computing system 703. For example, the frames 704 may be considered received 902 when the frames 704a,b are stored in memory or cache accessible to the processor 705.

The method of FIG. 9 also includes calculating 904 a differential between a first time corresponding to the first frame 704a and a second time corresponding to the second frame 704b. The differential defines a degree to which the first camera 702a and second camera 702b are synchronized or out of sync. In some embodiments, the first time and the second time are the times at which the first frame 704a and second frame 704b are received 902, respectively. This is distinct and independent from any time data associated with the first and second frames 704a,b by their respective cameras 702a,b, such as times at which the first and second frames 704a,b are captured or encoded. Thus, the first time and second time are determined by the receiver of the frames 704a,b (e.g., the processor 705, the automation computing system 703). In some embodiments, the first time and second time may be provided by some other source (e.g., some other process, service, or component of the automation computing system 703).

The method of FIG. 9 also includes determining 906 whether the differential exceeds a threshold. In some embodiments, the threshold is a single threshold to which the differential is compared. In some embodiments, the threshold is one of multiple thresholds to which the differential is compared. If the differential does not exceed the threshold, the first and second cameras 702a,b are considered synchronized and the method returns to receiving 902 first and second frames 704a,b from the first and second cameras 702a,b.

If the differential exceeds the threshold, the first and second cameras 702a,b are determined to be out of sync and the method advances to increasing 908 a frame rate of the first camera 702a relative to the second camera 702b by transmitting a padding data instruction 710 to the first camera 702a or the second camera 702b. The padding data instruction 710 includes an instruction 710 to modify the padding data setting of the first camera 702a or the second camera 702b receiving the instruction 710. For example, the frame rate of the first camera 702a may be increased by reducing the padding data setting of the first camera 702a. As another example, the frame rate of the second camera 702b may be reduced, thereby increasing the frame rate of the first camera 702a relative to the second camera 702b, by increasing the padding data setting of the second camera 702a,b. In some embodiments, the particular camera 702a,b selected may be based on one of the cameras 702a,b being designated as a reference camera 702a,b whose padding data setting is not modified. Thus, when a first camera 702a is out of sync with a second camera 702b and the first camera 702a is the designated reference camera 702a,b, the padding data setting of the second camera 702b is always modified. In some embodiments, a camera 702a,b may be selected for modifying the padding data setting randomly, based on one or more rules, or by other approaches as can be appreciated.

For rolling shutter cameras 702a,b, as starting the capture of each row in a frame 704a,b is staggered, modifies the number of rows encoded (e.g., reducing the padding data setting) modifies the amount of time required to capture a given frame 704a,b. As a camera 702a,b will start capturing the next frame 704a,b after encoding the previous frame 704a,b, modifying the padding data setting modifies the frame rate by modifying the amount of time spent capturing each frame 704a,b. This allows the frame rate of the camera 702a,b to be modified at a microsecond scale in contrast to adjusting the frame rate using single FPS increments at millisecond scale.

In some embodiments, modifying the padding data setting includes sending a instruction 710 to a camera 702a,b (e.g., the camera 702a,b whose frame 704a,b arrived later) to reduce the padding data setting. In some embodiments, the instruction 710 may be sent using a low-level API (e.g., below the operating system-level) implemented by the cameras 702a,b. In some embodiments, the instruction 710 may be sent by another approach. In some embodiments 710a,b, the instruction 710 may include a padding data setting modification indicating by how may rows the padding data setting of the receiving camera 702a,b should be modifying. As described in further detail below and in the preceding discussion, the padding data setting modification may be calculated according to a variety of factors, including the differential and the current operating frame rate and padding data setting of the out-of-sync camera 702a,b. The camera 702a,b operating at the modified padding data setting (e.g., encoding frames 704a,b at the modified padding data setting) until the first and second cameras 702a,b are resynchronized by virtue of the time differential between when their respective frames 704a,b are received 902 falling below the threshold. In some embodiments, the method of FIG. 9 is repeated for each received pair of frames 704a,b from cameras 702a,b.

As is set forth above, the frame rate of a given camera 702a,b may be modified by adding or removing an amount of padding data by modifying the padding data setting. In some embodiments, a determination is made as to whether to increase or decrease the frame rate of a camera 702a,b in order to resynchronize the cameras 702a,b is based on the differential (e.g., the degree to which the cameras 702a,b are out of sync. For example, where the differential is less than half the duration of a frame (e.g., for a 30 FPS camera, less than 33.33/2=16.66 ms), it will require fewer frames to resynchronize the cameras 702a,b by increasing the frame rate. Thus, reducing padding data will be selected. Were the differential half the duration, it will require fewer frames to resynchronize the cameras 702a,b by decreasing the frame rate. Thus, increasing padding data will be selected.

Figure 10:
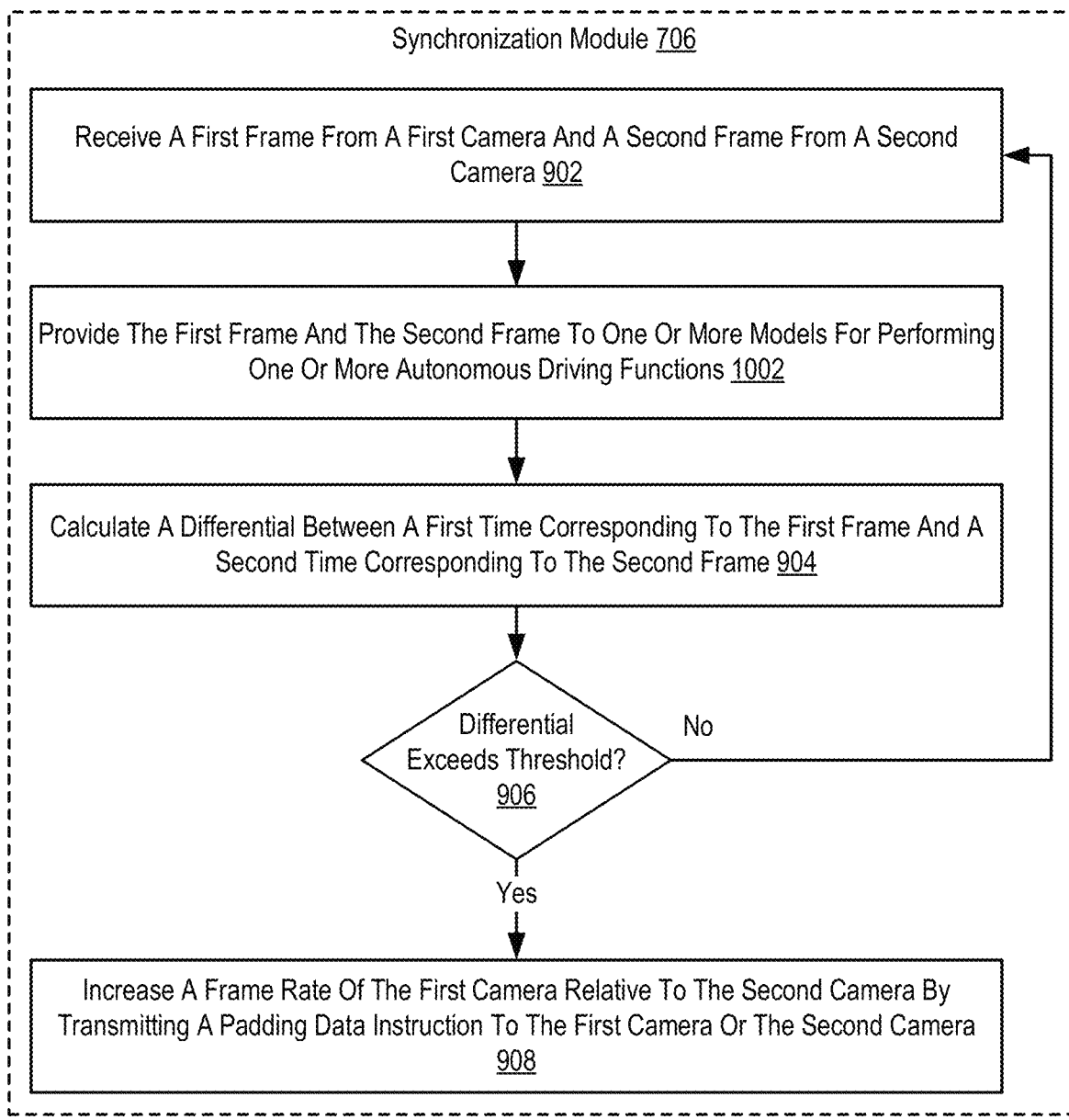
FIG. 10 is a flowchart of an example method for synchronizing stereoscopic cameras using padding data setting modification according to some embodiments of the present disclosure.

For further explanation, FIG. 10 sets forth a flowchart of another method for synchronizing stereoscopic cameras using padding data setting modification according to some embodiments of the present disclosure. The method of FIG. 10 is similar to FIG. 9 in that the method of FIG. 10 includes receiving 902 a first frame 704a from a first camera 702a and a second frame 704b from a second camera 702b; calculating 904 a differential between a first time corresponding to the first frame 704a and a second time corresponding to a second frame 704b; determining 906 whether the differential exceeds a threshold; and increasing 908 a frame rate of the first camera 702a relative to the second camera 702b by transmitting a padding data instruction to the first camera 702a or the second camera 702b.

The method of FIG. 10 differs from FIG. 9 in that the method of FIG. 10 includes providing 1002 the first frame 704a and the second frame 704b to one or more models. In some embodiments, the one or more models may include one or more models facilitating autonomous driving functions of an autonomous vehicle 100. For example, the one or more models may include a perception phase of an autonomous driving system, whereby data from the first frame 704a and second frame 704b are interpreted or otherwise analyzed before providing output into a neural network for generating autonomous driving decisions. In some embodiments, the one or more models may include one or models facilitating autonomous operation of another device. In some embodiments, the first frame 704a and the second frame 704b may be provided to the one or more models via one or more intermediary components, services, and the like. In some embodiments, the first frame 704a and second frame 704b, or data derived thereof, may be used in conjunction with data from other sensors such as one or more radar sensors to facilitate object detection, distance estimation for detected objects, and other features related to autonomous driving.

By providing 1002 the first frame 704a and the second frame 704b to one or more models, the one or more models will receive the first frame 704a and the second frame 704b independent of whether the first camera 702a and second camera 702b are synchronized. Accordingly, the one or more models may determine whether the first frame 704a and the second frame 704b are valid or otherwise usable in making decisions based on stereoscopic vision due to their respective time differences.

Figure 11:
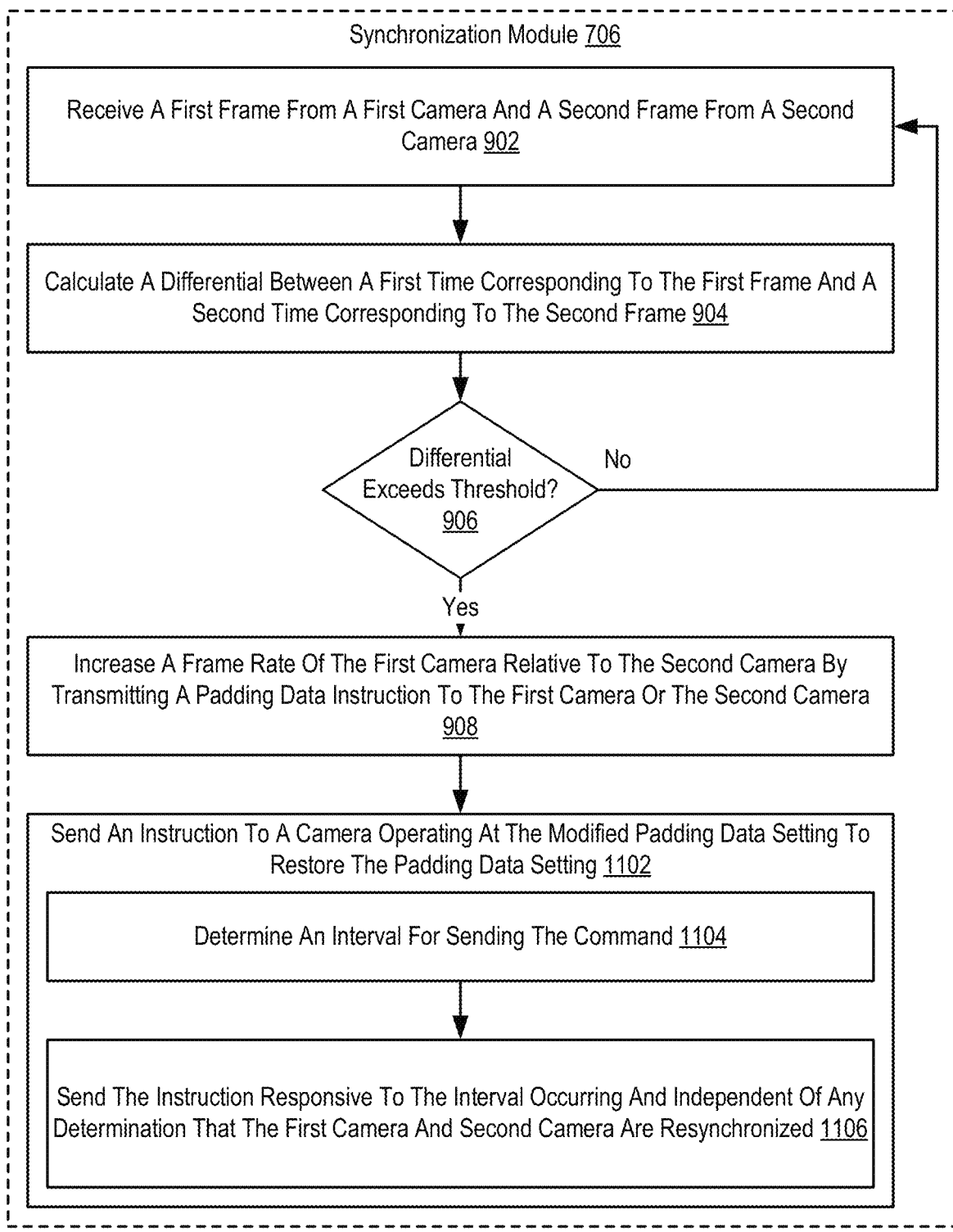
FIG. 11 is a flowchart of an example method for synchronizing stereoscopic cameras using padding data setting modification according to some embodiments of the present disclosure.

For further explanation, FIG. 11 sets forth a flowchart of another method for synchronizing stereoscopic cameras using padding data setting modification according to some embodiments of the present disclosure. The method of FIG. 11 is similar to FIG. 9 in that the method of FIG. 11 includes receiving 902 a first frame 704a from a first camera 702a and a second frame 704b from a second camera 702b; calculating 904 a differential between a first time corresponding to the first frame 704a and a second time corresponding to a second frame 704b; determining 906 whether the differential exceeds a threshold; and modifying 908 a frame rate of the first camera 702a relative to the second camera 702b by transmitting a padding data instruction to the first camera 702a or the second camera 702b.

The method of FIG. 11 differs from FIG. 9 in that the method of FIG. 11 includes sending 1102 a instruction 710 to a camera 702a,b operating at the modified padding data setting to restore the padding data setting (e.g., to the padding data setting prior to reduction). The camera 702a,b operating at the modified padding data setting is the camera 702a,b that received a instruction 710 to operate at a modified padding data setting due to being out of sync with the other camera 702a,b as described above.

In some embodiments, sending 1102 a instruction 710 to a camera 702a,b operating at the modified padding data setting to restore the padding data setting includes determining 1104 an interval for sending the instruction 710. For example, assuming some delay between sending 710 a instruction 710 and the instruction 710 be applied by the receiving camera 702a,b, in some embodiments, the instruction 710 is sent in anticipation of the cameras 702a,b being synchronized after some amount of frames 704a,b at the reduced padding data setting. This prevents the cameras 702a,b from operating at a reduced padding data setting longer than is required, potentially desynchronizing the cameras 702a,b after synchronization.

Accordingly, in some embodiments, the interval may be determined 1104 as a number of frames 704a,b at the modified padding data setting (e.g., resync frames 704a,b) required to resynchronize the cameras 702a,b. In some embodiments, this interval may begin at the next received frame 704a,b after sending a instruction 710 to reduce the padding data setting. The method of FIG. 11 also includes sending 1106 the instruction 710 responsive to the interval occurring an independent of any determination that the first camera 702a and second camera 702b are resynchronized.

For example, given four delay frames 704a,b and eight resync frames 704a,b, assume that a instruction 710 to modify a padding data setting is sent. The differential will be overcome after receiving twelve frames 704a,b after sending the instruction 710 (four delay frames 704a,b at the original padding data setting and eight resync frames 704a,b at the reduced padding data setting). Accordingly, a instruction 710 to restore the padding data setting will be sent after receiving eight frames 704a,b from the time at which the instruction 710 to reduce the padding data setting was sent. Thus, the instruction 710 will be to restore the padding data setting will take effect four frames 704a,b later such that the padding data setting will be restored on the thirteenth frame 704a,b.

Figure 12:
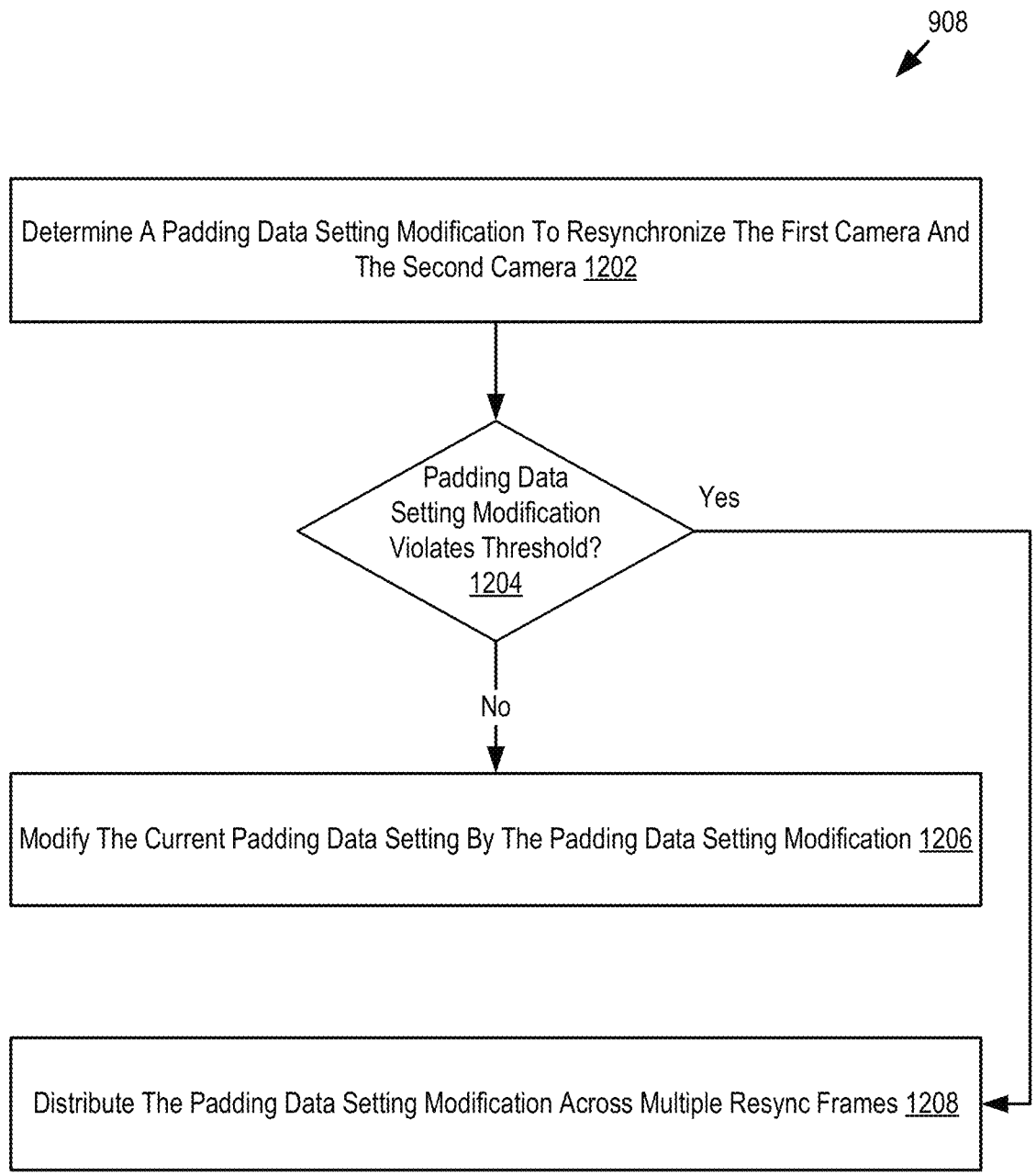
FIG. 12 is a flowchart of an example method for synchronizing stereoscopic cameras using padding data setting modification according to some embodiments of the present disclosure.

For further explanation, FIG. 12 sets forth a flowchart of an example method describing approaches for increasing 908 a frame rate of the first camera 702a or the second camera 702b by reducing a padding data setting of the first camera 702a or the second camera 908 as set forth in FIG. 9.

The method of FIG. 12 includes determining 1202 a padding data setting modification to resynchronize the first camera 702a and the second camera 702b. The padding data setting modification is a number of rows to be added or removed from padding data of frames 704a,b from the out-of-sync camera 702a,b in order to resynchronize the first camera 702a and the second camera 702b, either from a single frame 704a,b or distributed across multiple frames 704a,b.

Consider an example with two cameras 702a,b operating at thirty FPS and at 4208×3120 resolution and sixteen rows of padding data. Assume that a first camera 702a provides a first frame 704a at time $t_1$ and a second camera 702b later provides a second frame 704b at time $t_2$. Further assume that the differential between $t_1$ and $t_2$ (e.g., $t_1-t_2$) is 200 µs and the cameras 702a,b are determined to be out of sync in response to the differential exceeding a threshold of 100 µs. In this example, each row added or removed from the padding data of a frame 704b would modify the frame rate of the second camera 702b by approximately 10.63 µs. Accordingly, assuming an embodiment where the padding data setting will be reduced, in order to reduce the differential by 100 µs ten rows of padding data would need to be removed.

The method of FIG. 12 also includes determining 1204 whether the padding data setting modification violates a threshold (e.g., a minimum or maximum padding data setting). The padding data setting modification violates the minimum padding data setting if the current padding data setting, when modified by the padding data setting modification, falls below a minimum padding data setting or exceeds a maximum padding data setting.

If the padding data setting modification does not violate the threshold this allows for a number of rows equal to the padding data setting modification to be removed from the padding data of a single frame 704a,b. In other words, the first and second cameras 702a,b can be resynchronized using a single frame 704a,b at the modified padding data setting. Accordingly, the padding data setting modification does not violate the threshold, the method advances to modifying 1206 the current padding data setting (e.g., of the out-of-sync camera 702a,b) by the padding data setting modification.

If the padding data setting modification violates the threshold, method of FIG. 12 proceeds to distributing 1208 the padding data setting modification across multiple resync frames 1208. In other words, the padding data setting of the out-of-sync camera 702a,b will be modified by some value less than the padding data setting modification. This will necessitate that multiple resync frames 704a,b at the modified padding data setting will be used to resynchronize the first and second cameras 702a,b.

In some embodiments, the modified padding data setting may be determined based on a fewest number of resync frames 704a,b required while satisfying the threshold. In other embodiments, the modified padding data setting may be calculated based on a maximum resync time (e.g., a maximum number of resync frames 704a,b). For example, the padding data setting modification may be divided by the maximum resync time $t_0$ calculate a scaled padding data setting modification. The modified padding data setting may then be set to the current padding data setting as modified by the scaled padding data setting modification. Thus, the first and second cameras 702a,b will be synchronized after receiving the maximum number of resync frames 704a,b.

Although the approaches above describe modifying a frame rate of a camera by modifying a padding data setting of the camera, other camera setting modifications are also contemplated within the scope of the present disclosure. For example, the approaches above may also be applied to modifying a number of rows of active data (e.g., data encoding active image data captured by the camera) to modify the overall number of rows encoded in a particular frame, thereby modifying the frame rate. As another example, the approaches above may also be applied to modify a number of columns of padding data and/or active pixels encoded into a given frame.

In view of the explanations set forth above, the benefits of synchronizing stereoscopic cameras using padding data setting modification according to embodiments of the present disclosure include:

Resynchronizing cameras without modifying a clock signal diving each camera.

Resynchronizing cameras using scale frame rate modifications smaller than those possible by incrementing a frame rate by frames-per-second.

Resynchronizing cameras that do not share a same clock signal.

Exemplary embodiments of the present disclosure are described largely in the context of a fully functional computer system for synchronizing stereoscopic cameras using padding data setting modification. The present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   receiving a first frame from a first camera and a second frame from a second camera;
   calculating a differential between a first time corresponding to the first frame and a second time corresponding to the second frame;
   determining whether the differential exceeds a threshold; and
   increasing, responsive to the differential exceeding the threshold, a frame rate of the first camera relative to the second camera without modifying active pixels to include in generated frames by transmitting a padding data instruction to the first camera or the second camera, wherein the padding data instruction defines an amount of padding data to include in the generated frames.

2. The method of claim 1, wherein the padding data instruction defines an amount of row padding included in generated frames.

3. The method of claim 1, wherein the padding data instruction defines an amount of line padding included in generated frames.

4. The method of claim 1, wherein increasing the frame rate of the first camera relative to the second camera comprises reducing padding data of the first camera.

5. The method of claim 1, wherein increasing the frame rate of the first camera relative to the second camera comprises increasing padding data of the second camera.

6. The method of claim 1, wherein the first time comprises a time when the first frame was received and wherein the second time comprises a time when the second frame was received.

7. The method of claim 1, wherein the instruction is transmitted via a low-level Application Program Interface (API).

8. The method of claim 1, wherein calculating the differential and determining the differential are repeatedly performed for each subsequent frame pair received from the first camera and the second camera.

9. The method of claim 1, further comprising sending, after receiving a number of frame pairs from the first camera and the second camera, to a camera operating at a modified padding data setting, an instruction to restore an original padding data setting.

10. The method of claim 1, wherein the first camera and the second camera are arranged in stereoscopic mode and included in an autonomous vehicle.

11. An apparatus configured to perform steps comprising:
    receiving a first frame from a first camera and a second frame from a second camera;
    calculating a differential between a first time corresponding to the first frame and a second time corresponding to the second frame;
    determining whether the differential exceeds a threshold; and
    increasing, responsive to the differential exceeding the threshold, a frame rate of the first camera relative to the second camera without modifying active pixels to include in generated frames by transmitting a padding data instruction to the first camera or the second camera, wherein the padding data instruction defines an amount of padding data to include in the generated frames.

12. The apparatus of claim 11, wherein the padding data instruction defines an amount of row padding included in generated frames.

13. The apparatus of claim 11, wherein the padding data instruction defines an amount of line padding included in generated frames.

14. The apparatus of claim 11, wherein increasing the frame rate of the first camera relative to the second camera comprises reducing padding data of the first camera.

15. The apparatus of claim 11, wherein increasing the frame rate of the first camera relative to the second camera comprises increasing padding data of the second camera.

16. The apparatus of claim 11, wherein the first time comprises a time when the first frame was received and wherein the second time comprises a time when the second frame was received.

17. The apparatus of claim 11, wherein the instruction is transmitted via a low-level Application Program Interface (API).

18. The apparatus of claim 11, wherein calculating the differential and determining the differential are repeatedly performed for each subsequent frame pair received from the first camera and the second camera.

19. The apparatus of claim 11, wherein the first camera and the second camera are arranged in stereoscopic mode and included in an autonomous vehicle.

20. An autonomous vehicle comprising:
    a first camera;
    a second camera arranged in a stereoscopic mode with the first camera; and an apparatus configured to perform steps comprising:

receiving a first frame from the camera and a second frame from the second camera;

calculating a differential between a first time corresponding to the first frame and a second time corresponding to the second frame;

determining whether the differential exceeds a threshold; and increasing, responsive to the differential exceeding the threshold, a frame rate of the first camera relative to the second camera without modifying active pixels to include in generated frames by transmitting a padding data instruction to the first camera or the second camera, wherein the padding data instruction defines an amount of padding data to include in the generated frames.

* * * * *